Dec. 10, 1929.　　　　E. WILDHABER　　　　1,739,196
AXLE
Filed June 30, 1927
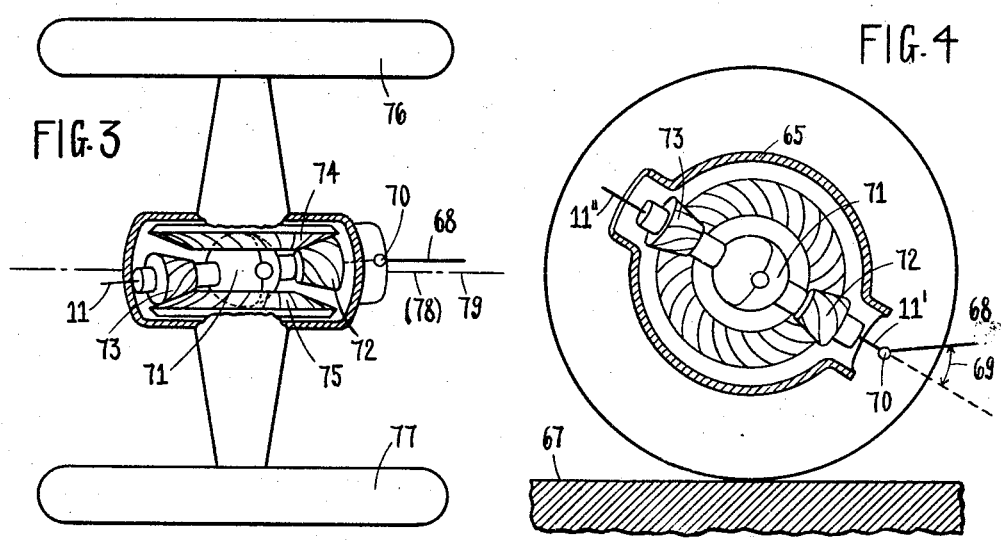
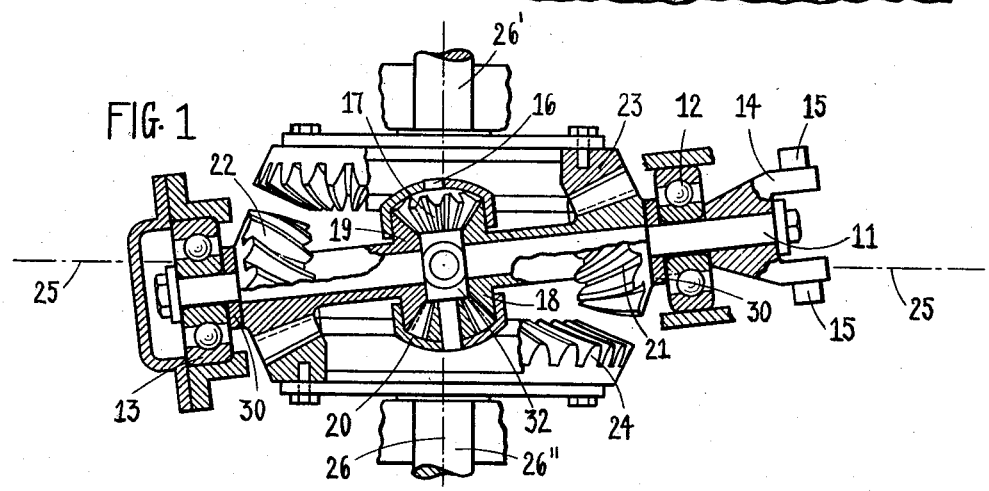
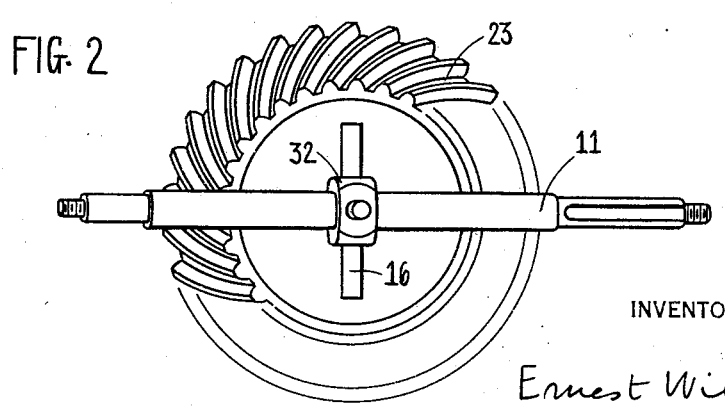
INVENTOR
Ernest Wildhaber Patented Dec. 10, 1929

1,739,196

UNITED STATES PATENT OFFICE

ERNEST WILDHABER, OF BROOKLYN, NEW YORK

AXLE

Application filed June 30, 1927. Serial No. 202,582.

The present invention relates to axles, and primarily to axles for trackless vehicles, such as automobiles, trucks and tractors.

The type of axles chiefly referred to contains a differential mechanism, and a gear reduction arranged after the differential mechanism. The said gear reduction moreover consists of an angular drive, the two gears of a pair having angularly disposed axes. Such gears are called bevel gears, when their axes intersect, in their elongation, and they are called hypoid gears, when their axes are offset from each other.

One object of the present invention is to provide an axle suited for automobiles, in which the driving mechanism can be kept down to a minimum smaller than has hitherto been possible.

A further aim is to provide an axle of novel type combined with a uniform motion universal joint.

A still further object is to provide an axle, in which the final drive is operated with tooth loads, of which the axial thrusts are balanced, so that operation with angular drives is effected in a manner equivalent to the action of herringbone gears.

Another object is to devise a novel axle, which permits of a very low body design.

Other objects will be apparent in the course of the specification and from recital of the appended claims.

Embodiments of my invention are illustrated in the accompanying drawings, in which—

Fig. 1 is a plan view, partly in section, of the driving mechanism of an axle constructed in accordance with my invention.

Fig. 2 is a partial elevational view corresponding to Fig. 1, showing the drive shaft (11) and a gear (23) in their relative positions.

Fig. 3 is a diagrammatic plan view, partly a section, of an axle constituting a modified embodiment of the invention.

Fig. 4 is a front elevational view and section corresponding to Fig. 3.

In the Figures 1 and 2, the numeral 11 denotes a drive shaft receiving power from a motor. Shaft 11 is journalled in two bearings 12, 13, and carries on its driving end suitable means for receiving power, such as a fork 14 having pivots 15, and forming part of a universal joint of known or of novel construction.

Drive shaft 11 contains a number of pivots 16, disposed at right angles to its axis and intersecting said axis, and which may be made integral with shaft 11. Planetary pinions 17 are journalled on said pivots, and kept in engagement with two gears 18, 19 by a split casing 20. Pinions 17 and gears 18, 19 constitute a differential mechanism or differential gear of known type. The gears 18, 19 are coaxial and integral with two tapered pinions 21, 22 respectively, which mesh with two coaxial gears 23, 24, pinion 21 meshing with gear 23; and pinion 22 meshing with gear 24. Interference between pinion 21 and gear 24 and on the other hand between pinion 22 and gear 23 is avoided by tilting the common axis of the pinions (11), so that it is inclined to a plane 25 perpendicular to the common axis 26 of the gears.

The gears 23, 24 are respectively connected with two road wheels (such as 76, 77 in Fig. 3) of a vehicle, through shafts 26′, 26″.

In the embodiments of my invention, where the axes 11 and 26 intersect, that is to say where bevel gears are used for the final gear reduction of the axle, I preferably provide the pinions 21, 22 with teeth inclined to the straight generatrices of their pitch surfaces, and arrange the teeth in opposite hands on the two pinions, so that one pinion (22) is right hand, and the other (21) is left hand. Moreover preferably large tooth inclinations or spiral angles are provided, usually as large as 40°, and equal tooth inclinations or spiral angles on the two pinions.

The components of the tooth loads extending parallel to the axis of the pinions, that is to say the thrust loads exerted on the pinions through the meshing gears 23, 24, are opposite and equal, and therefore completely balance each other. The pinions 21, 22 transmit their thrust loads to collars 30, and thence to shaft 11, or directly to a projection 32 of shaft 11. In ordinary operation, namely when the vehicle travels in a straight path, pinions 21, 22, collars 30 and shaft 11 turn as a unit, and no relative motion exists between either part. The power transmission is then similar to the transmission with double helical or herringbone gearing. Slight relative motion results only during the short periods, when the vehicle turns a corner, in which case the differential pinions 17 turn on their journals 16, as well known.

With the present invention it is possible to obtain the smooth action of inclined teeth or spiral teeth on bevel gears, without the disadvantage of large thrust loads, in fact without thrust load. The loads on the bearings 12, 13 are moreover comparatively small, on account of their large distance from one another; and the shafts are rigidly held therein. Further it is noted that the blanks of the pinions 21, 22 are equal, and the blanks of the gears 23, 24 are equal also, slight advantages which are nevertheless appreciated in production.

In one embodiment of my invention, the drive shaft 11 is arranged in horizontal direction, see Fig. 2, and substantially parallel to the plane which is tangent to all the road wheels of the vehicle. This embodiment follows in that respect present current practice.

Axles constructed according to the present invention generally rely for smooth operation on universal joints or levers somewhat more than standard axles. Special attention is therefore paid to suitable selection of such joints or rotary levers. Preferably I use means of the character of a universal joint adjacent the drive shaft 11, which are suited to transmit true uniform motion.

A further important embodiment of my invention is diagrammaticaly illustrated in Fig. 3 and Fig. 4. It is generally desirable not only to keep the differential casing 65 at a smallest possible diameter, but also to lower the drive from the engine to said differential casing, for gaining space and for making possible a low design, effecting a low center of gravity of the complete vehicle.

This aim is obtained in the present case, Fig. 3 and Fig. 4, by inclining the drive shaft (11) to the plane (67) which is tangent to all the road wheels of the vehicle, ordinarily to the four wheels of a car or truck. The inclination angle towards this plane, which may be referred to briefly as a horizontal plane, is preferably in excess of ten degrees (10°), the driving end 11′ being lower than the opposite end 11″. Except for the different position of the drive shaft with respect to said plane, the design of the driving mechanism is kept along the same lines as described with reference to Fig. 1.

Power is applied to shaft 11 from a shaft 68, which is diagrammatically indicated as a line, and which ordinarily includes a considerable angle 69 with shaft 11. Preferably a uniform motion universal joint is used for connecting the shafts 68 and 11. Such a joint is diagrammatically indicated as a small circle 70. Joint 70 transmits true uniform motion at any angular position of the two shafts 68 and 11, and, unlike a pair of gears, can be kept free from backlash at different angles 69. It takes the place of a universal joint, without having its drawback of transmitting periodically changing motion, when the angularity is considerable.

In operation, the drive shaft 11 rotates the differential 71, which in turn transmits equal torque to the two coaxial spiral bevel pinions 72, 73. These pinions mesh with two gears 74, 75 respectively, which are connected with the road wheels 76, 77 of the vehicle. The gears 74, 75 are preferably coaxial. If so desired, gear 74, wheel 76 and their connecting means, and on the other hand gear 75, wheel 77 and the connecting means, may be so mounted as to permit individual angular displacement about an axis (78) which is the projection of the axis of shaft 11 to the vertical plane 79. Such displacement or swinging motion may sometimes be provided for taking up shock loads with springs.

Preferably the motor is set at a lower level as compared with the conventional bevel gear drive.

Further changes and modifications may be made in my invention without departing from its spirit. For definition of its scope I rely on the annexed claims.

What I claim is:

1. An axle, containing a drive shaft, two bevel pinions coaxial with said drive shaft, a differential mechanism for transmitting torque to said pinions, two bevel gears meshing with said pinions and constituting two pairs, both pairs containing teeth inclined to the straight generatrices of their pitch surfaces, the teeth being arranged in opposite hands on the two pinions, the axis of the pinions being inclined to a plane perpendicular to the axis of a gear.

2. An axle, containing a drive shaft, two tapered pinions coaxial with said drive shaft, a differential mechanism for transmitting torque to said pinions, two tapered gears meshing with said pinions and constituting two pairs, both pairs containing teeth inclined to the straight generatrices of their pitch surfaces, the teeth being arranged in opposite hands on the two pinions, and the axis of the pinions being inclined to a plane perpendicular to the axis of a gear.

3. An axle containing two coaxial spiral bevel gears operatively connected with two road wheels respectively, two coaxial spiral bevel pinions meshing with said gears and having a center line inclined to a plane perpendicular to the center line of said gears, said pinions containing curved teeth arranged in opposite hands, and a differential mechanism for transmitting torque to said pinions.

4. An axle containing two coaxial spiral bevel gears of equal diameters connected with two road wheels respectively, two coaxial spiral bevel pinions meshing with said gears and having a center line inclined to a plane perpendicular to the center line of said gears, said two pinions containing teeth inclined by equal angles to the straight generatrices of their pitch surfaces and arranged in opposite hands, and a differential mechanism for transmitting torque to said pinions.

ERNEST WILDHABER.